United States Patent [19]
Yemington

[11] 3,882,365
[45] May 6, 1975

[54] DC MOTOR CONTROL CIRCUIT

[75] Inventor: Charles R. Yemington, Waynesboro, Va.

[73] Assignee: General Electric Company, Salem, Va.

[22] Filed: June 18, 1973

[21] Appl. No.: 371,270

[52] U.S. Cl. .............................................. 318/269
[51] Int. Cl. ............................................ H02p 3/10
[58] Field of Search ........... 318/258, 261, 284, 373, 318/269, 341, 376

[56] References Cited
UNITED STATES PATENTS

| | | | |
|---|---|---|---|
| 3,458,790 | 7/1969 | Wilkerson | 318/269 X |
| 3,532,951 | 10/1970 | Hovance | 318/373 X |
| 3,584,281 | 6/1971 | Reeves et al. | 318/258 |
| 3,586,944 | 6/1971 | Cooper et al. | 318/258 |
| 3,665,275 | 5/1972 | Robinson | 318/261 |

Primary Examiner—Robert K. Schaffer
Assistant Examiner—W. E. Duncanson, Jr.
Attorney, Agent, or Firm—Arnold E. Renner

[57] ABSTRACT

A control circuit for a direct current motor which is to be operable from a source of alternating current power including a full wave controlled rectifier bridge circuit which supplies electrical power to the motor through appropriate circuit means selectively in one of two directions so as to control the direction of rotation of the motor. A braking circuit is also included which upon activation senses the direction of motor rotation and responds to this sensing by causing, in association with the switching means, the reversal of power application to the motor to bring the motor to a stop in a regenerative mode.

14 Claims, 2 Drawing Figures

DC MOTOR CONTROL CIRCUIT

BACKGROUND OF THE INVENTION

The present invention relates generally to direct current motor control circuits of the type in which alternating current from a source is rectified and applied to the motor through a phase controlled bridge circuit to control the effective voltage thereof and more particularly to such circuits which further include regenerative braking means for the application of power to the motor in a direction in opposition to that associated with the direction of motor rotation.

It is well known in the art that a speed of a direct current (d.c.) motor can be made a function of the effective applied voltage. When d.c. motors are powered from an alternating current (a.c.) power source, it is known that the effective voltage may be varied by employing a controllable rectifying bridge, the most common of which in use today consists of two thyristors or other controllable rectifiers and two diodes. Through the application of a suitable gating pulse to the appropriate rectifier in each of the applied voltage half-cycles, the appropriate rectifier-diode path is rendered conductive. By varying the point within the half-cycle that the appropriate rectifier is rendered conductive, the effective voltage applied to the load from the bridge may be varied. This is what is commonly known in the art as phase controlling. More recently it has been known to provide a bridge employing four controlled rectifiers (hereinafter referred to as thyristors) and apply gating pulses to opposite thyristors simultaneously in a manner similar to that done in the prior art. For a more complete understanding of this type of system and the advantages attendant thereto, reference is made to U.S. Pat. No. 3,813,591, "DC Motor Speed Control Circuit" by Edward H. Dinger, issued May 28, 1974 and assigned to the assignee of the present invention.

It is also known in the art to provide some form of electrical braking to a motor. Perhaps the most common form is the so-called dynamic braking system in which a resistor is connected across the motor armature and is placed in circuit with the armature at the time of braking to dissipate the motor's rotational energy as heat. Dynamic braking suffers from the obvious disadvantage of having to limit the cycle rate of braking unless extremely large and relatively expensive resistor and heat sinking requirements are met for the dissipation of the energy. In addition, because the braking force is directly proportional to the armature voltage, there results a rather heavy torque peak at the time braking is initiated which thereafter tapers off to a low torque value. This torque profile may result in undesirable mechanical shock to the load being driven by the motor.

A second type of braking known in the art is a so-called regenerative braking in which the system inertia is utilized to drive the motor and in which the motor acts as a generator to return power to the lines. Known systems of this type employ two controlled rectifier bridges of the type described earlier each employing four thyristors; one brige for clockwise torque and one bridge for counter-clockwise torque. This double system, of course, entails and necessitates the use of additional semiconductors along with their associated heat sinking, firing circuits, interconnecting wiring, etc. It has further been the practice to provide a zero speed circuit or a zero sensing circuit across the armature to sense when the armature has gone to zero speed so that the switch between thyristor bridges may be made. This, of course, results in a complex and rather expensive motor control system but does provide the advantages of a more linear torque upon braking and alleviates the necessity of the resistors for the dissipation of heat as is the case in dynamic braking.

It is, therefor, an object of the present invention to provide a new and improved direct current motor control circuit.

It is a further object to provide a new and improved motor control circuit having braking means of the regenerative type.

Another object is to provide an improved d.c motor control circuit employing a rectifying bridge having a controlled rectifier in each leg thereof, which bridge is phase controlled, and which circuit further includes a braking means which when actuated serves to automatically apply a voltage in opposition to that which the motor is then operating to provide regenerative braking.

SUMMARY OF THE INVENTION

The foregoing deficiencies of the prior art and the above and other advantages are accomplished in accordance with the present invention by providing a control circuit for a d.c. motor which includes a full wave rectification bridge having a controlled rectifier in each leg of that bridge. The bridge is designed to be operated from an a.c. source and there is further provided means for phase controlling the rectifiers to vary the effective voltage of the power supplied to the motor. A reversing circuit means is provided for selectively determining the relative direction of power as applied to the motor and is operably connected with a braking circuit which is selectively operable and which when activated applied the appropriate voltage in accordance with the then existing operational set up of the system to provide regenerative braking to the motor.

DESCRIPTION OF THE DRAWINGS

For a better understanding of the present invention, reference is made to the accompanying drawings which.

DETAILED DESCRIPTION

Figure 1:
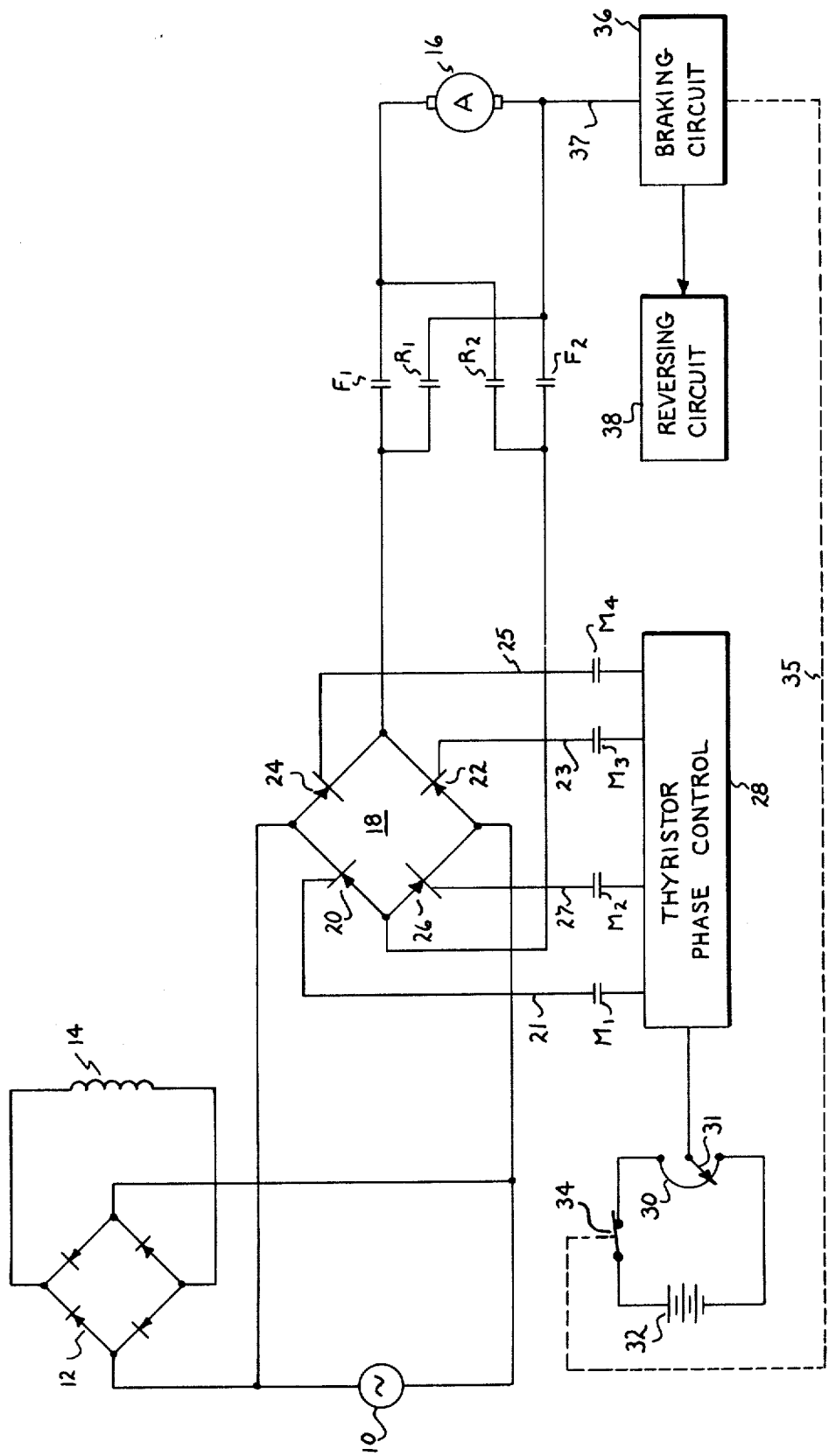
FIG. 1 is a schematic drawing partially in block form illustrating the present invention in its preferred embodiment; and, FIG. 2 is a schematic diagram illustrating in greater detail certain portions of the invention shown in FIG. 1 in block form.

Referring now to FIG. 1 which illustrates the present invention in its preferred embodiment employing a shunt wound d.c. motor, it is seen that there is provided a source of alternating current 10 across which is provided a diode bridge 12 which supplies full wave rectified d.c. power to a field winding 14 of the motor which is to be controlled in accordance with the present invention. A second full wave rectification bridge indicated generally at 18 is also connected across the a.c. source 10. The bridge 18 is comprised of four controlled rectifiers 20, 22, 24, and 26 which are preferably of that class of rectifier known as thyristors although other forms of controlled rectifiers may be employed. For purposes of convenience the term thyristor will be used hereinafter in this specification. Each of the thyristors 20, 22, 24, and 26 includes a gate lead 21, 23, 25, and 27, respectively, which is connected through a respective contact $M_1$, $M_2$, $M_3$ and $M_4$ to a thyristor phase control 28.

As is known in the art, thyristors become conductive upon the application thereto of a forward bias voltage and an input signal on its gating electrode. Conduction, once initiated, continues until such time as the bias on the thyristor goes to about zero voltage at which time it becomes nonconductive. The thyristor phase control 28 may be any of those which are well known in the art and is shown as manually adjustable. That is, the thyristor phase control may be set to conduct at any desired time within the half-wave of the a.c. input from the source 10 to provide at the output of the bridge a varying effective voltage. In the embodiment illustrated in FIG. 1 this control is illustrated by a potentiometer 30 which includes an adjustable wiper arm 31, the adjustment of the wiper arm representing the function of the manual setting. The output from the wiper arm 31 is supplied to the thyristor phase control 28 to vary its conduction or phase angle all in a manner which is well known in the art. Potentiometer 30 is connnected to a suitable source of power which is illustrated in FIG. 1 as a battery 32 for sake of simplicity. Connection is made through a switch 34 which is illustrated by means of the dashed line 35 as being under control of a braking circuit 36. The function of the braking circuit and the manner in which it controls the operation of switch 34 will be explained in detail with respect to FIG. 2.

It will be remembered that it was stated that each of the gating leads of the four thyristors of the bridge 18 is connected to the thyristor of phase controlled circuit 28 by means of a contact which contacts are designated as $M_1 - M_4$. Before proceeding with the detailed description of the present invention, it is believed well to briefly state the convention to be used in this description concerning contacts. In the illustrated embodiment of the invention there are included a number of relays the coils of which each control one or more contacts. Each coil is illustrated as a circle with a letter designation and all contacts associated with that coil are designated by the same letter with a distinguishing numerical subscript. For example, each of the contacts, $M_1 - M_4$, is under the control of a relay coil M. As a further convention, each of the contacts is shown in that position it normally occupies when the relay coil is not energized.

Returning to the description of FIG. 1, the rectified full wave varying voltage output from the bridge 18 is supplied to an armature 16 of the motor selectively through either of two pairs of contacts. A first pair of contacts $F_1$ and $F_2$ are in the closed position when the armature 16 is supplied with power to run in a first direction arbitrarily labeled the foward direction. Conversely, upon the opening of the $F_1$ and $F_2$ contacts and the closing of the second pair of contacts, $R_1$ and $R_2$, it is seen that the voltage applied to the armature from the bridge 18 is in a direction opposite to that prevailing when $F_1$ and $F_2$ contacts are closed such that the armature 16 will rotate in the opposite direction, here defined as reverse.

Connected by means of a suitable lead 37 to one side of the armature 16 is a braking circuit 36 such that the braking circuit is capable of sensing the voltage appearing across the armature. The braking circuit in turn provides a signal to a reversing circuit 38 which, inter alia, determines the condition of the contacts $F_1$, $F_2$ and $R_1$, $R_2$ to in turn control the direction of motor operation.

Figure 2:
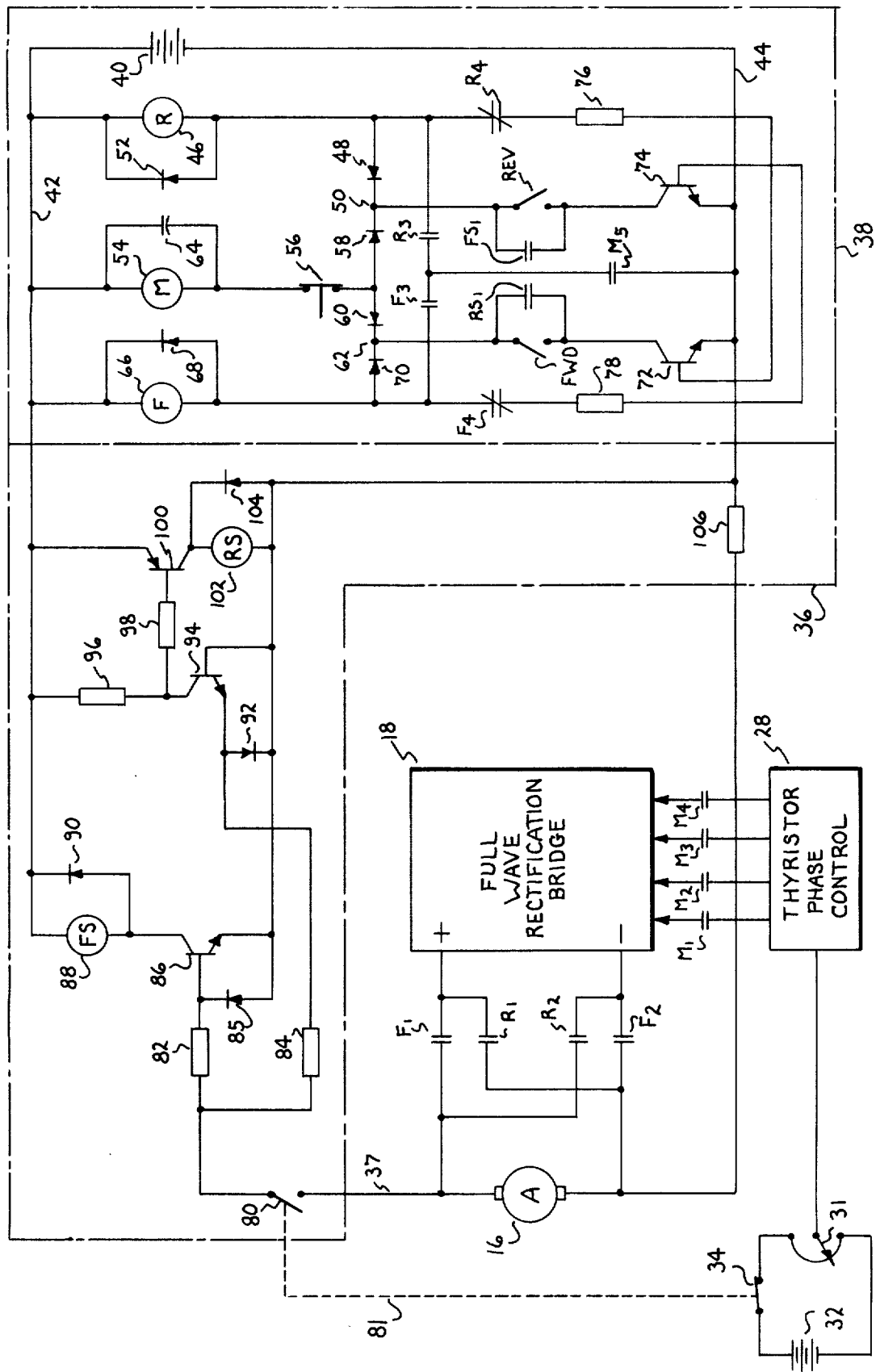

Referring now to FIG. 2 there is shown a portion of the overall system as shown in FIG. 1 and in addition there is included certain portions shown in block form in FIG. 1 in greater detail. In FIG. 2 the full wave rectification bridge 18 is shown in block form and connected once again to be under the control of the thyristor phase controlled circuit 28 through the four lines having the respective contacts $M_1 - M_4$ in each of the lines. As in FIG. 1, the thyristor control is represented as being under the control of the potentiometer 30. Also as in FIG. 1 the full wave bridge supplied power to the armature 16 of the motor by way of the four contactors $F_1$, $F_2$ and $R_1$, $R_2$. Operation of the contactors $F_1$, $F_2$ and $R_1$, $R_2$ are in part under the control of the reversing circuit 38 which is shown in FIG. 2 in detail. Referring now to the reversing circuit 38 it is seen that there is included a suitable source of power which has been represented as a battery 40. The positive terminal of the battery 40 is connected to a common bus 42 and its negative terminal connected to a negative bus 44. A first relay coil 46 designated R (standing arbitrarily for the reverse direction) has one end connected to the positive bus 42 and its free end is connected through a diode 48 to a junction 50. A free wheeling diode 52 is connected in parallel with the R coil 46 for the protection of that coil by providing a current path when the field of the coil collapses.

A second coil 54 designated the M coil is also connected from the positive bus 42 through a stop switch 56 and a diode 58 to the junction 50. The stop switch 56 is solely for the purpose of removing power from the system to allow the motor to stop. An additional diode 60 connects the junction between switch 56 and diode 58 to a second junction 62. A capacitor 64 is connected in parallel with the M coil 54 and serves as a delay means for the operation of that coil such that upon the application of voltage thereto there is a slight delay before the coil becomes sufficiently energized to actuate its associated contacts. In this respect it should be noted that a portion of the contacts actuated by the coil 54 are the contacts $M_1-M_4$ which are intermediate the thyristor phase control 28 and the full wave rectification bridge 18.

A third coil 66 designated F (forward) is also connected to the positive bus 42 and is provided with a free-wheeling diode 68 connected to parallel therewith. This parallel connection is in series with a diode 70 which is connected to the junction 62. A series connection of a contact $F_3$ and a second contact $M_5$ is connected between the junction of the F coil 66 and the diode 70 and the negative bus 44. In a similar manner a contact $R_3$ in series with the $M_5$ contact is connected between the junction of the R coil 46 and the diode 48 and a negative bus 44. The $F_3$, $R_3$ and $M_5$ contacts, as indicated, are normally open contacts.

A switch FWD (forward) is connected in series with a transistor 72 between the junction 62 and the negative bus 44 with the emitter of that transistor being connected to the bus 44 and the collector being connected to the FWD switch. In a similar manner, a second switch REV (reverse) forms a series connection with a second transistor 74 between the junction 50 and the negative bus 44. The FWD switch is paralleled by a normally open contact $RS_1$ and the REV switch is paralleled by a normally opened contact $FS_1$ for purposes to be described hereinafter.

The two transistors 72 and 74 act as interlocks and could be replaced by mechanical type switches which are locked mechanically with the forward and reverse operations respectively. To the end that these are interlock type devices, it is noted that the base of the transistor 72 is connected through a suitable scaling resistor 76 and a normally closed contact $R_4$ to the junction between the R coil 46 and the diode 48. In a similar manner the base of transistor 74 is connected through a suitable resistor 78 and a normally closed contact $F_4$ to the junction of the F coil 66 and the diode 70. The two switches FWD and REV are preferably mechanically interlocked so that only one of the switches may be closed at any one time. This interlocking has not been shown for purposes of maintaining the drawing in its simplest form.

The reversing circuit 38, excluding the contacts $RS_1$ and $FS_1$ which are associated more closely with the braking circuit 36, provides for the directional control of the armature 16. The operation of this circuit is substantially as follows. Assuming first that it is desired to drive the motor in the forward direction the FWD switch is first closed. It will be noted that the $R_4$ contact is normally closed and a current path exists from the positive bus 42 through the R coil 46, contact $R_4$, and resistor 76 to supply a positive bias to the base of transistor 72 such that it is in the conductive state. With the closing of the FWD switch a current path is established from the bus 42 through the F coil 66, diode 70, the FWD switch and the transistor 72 to the negative bus 44. With this current path, the F coil 66 will be energized and that coil will activate the contacts associated therewith. Specifically, contacts $F_1$ and $F_2$ between the bridge 18 and the armature 16 will close as will contact $F_3$ and contact $F_4$ will open. Nothing will happen at this time, however, in that the $M_1$–$M_4$ contacts between the thyristor phase control 28 and the bridge 18 are still open thus preventing the bridge from applying power to the armature 16.

The closing of the FWD switch also establishes a current path through the M coil 54, stop switch 56, diode 60, the FWD switch and the transistor 72. It will be remembered, however, that the M coil 54 is provided with a parallel connected capacitor 64 such that the energization of this coil to an extent sufficient to allow it to actuate its associated contacts will be delayed. This delay is provided so that the other contacts are allowed sufficient time to settle and for all "bouncing" to have stopped before power is applied to the motor. After the short time delay occasioned by the capacitor 64, the M coil 54 will be sufficiently energized to actuate its respective contacts. When this occurs, contacts $M_1$–$M_4$ will close permitting the full wave rectification bridge 18 to apply power to the armature. Contact $M_5$ will also close. With the actuation of the F coil 66, the normally closed $F_4$ contact in the base circuit of transistor 74 will be opened thereby removing the bias from that transistor and rendering it nonconductive. So long as the FWD switch is maintained closed, both the F coil 66 and the M coil 54 are maintained in the energized condition and the armature 16 of the motor will operate at a speed which is governed by the thyristor phase control 28.

When it is desired to change the direction of motor rotation, in the present example from forward to reverse, it is merely necessary to close the REV switch. It will be remembered that the FWD and REV switches are mechanically interlocked so that upon the closure of one the other will open. In the present example, therefore, with the closure of the REV switch the FWD switch will open which immediately removes the conductive path for the M coil 54. The F coil 66 will remain energized momentarily by the conductive path through the $F_3$ and $M_5$ contacts. After a short delay, once again occasioned by capacitor 64, the M coil will become deenergized and all contacts associated therewith, namely contacts $M_1$–$M_4$ and $M_5$ will open. With the opening of these contacts, power is immediately withdrawn from the armature 16 in that the thyristor phase control 28 is no longer permitting the operation of the full wave rectification bridge 18. After a short period of time, which is dependent upon the time necessary for the field of the F coil 66 to collapse, the contacts associated with the coil will then be operated. Specifically, contacts $F_1$, $F_2$ and $F_3$ will open and contact $F_4$ will close. With the REV switch now closed and with the closure of contact $F_4$, transistor 74 is now biased to conduction and a current path will be established for the R coil 46 through that coil, diode 48, REV switch and transistor 74. This will immediately activate the R coil 46 causing contact $R_4$ to open and contact $R_1$, $R_2$ and $R_3$ to close. After a short delay, as previously described, the M coil 54 will become energized closing its contacts $M_1$–$M_5$ and power may once again be applied to the armature 16 from the full wave rectification bridge 18. In this case, however, the direction of power application to the armature will be a direction opposite to that previously causing the motor to run in what is here termed the reverse direction.

In a manner similar to that described with respect to going from forward to reverse, if the direction of the motor rotation is desired to be once again changed, the closure of the FWD switch will open the REV switch and remove energization from the M coil 54 which will open after a short delay as previously described. The remaining operation of contacts is similar to that just described.

The stop switch 56, when operated, opens the line to the M coil 54 to open the contacts associated with that coil and thus opens the thyristor gate circuits to stop the motor without braking. It is noted that one advantage of the present system is that the contacts $F_1$, $F_2$ and $R_1$, $R_2$ which are actually delivering power to the armature 16 are not required to open under full current. This is because in the particular construction provided the contacts ($M_1$ - $M_4$) which control the full wave rectification bridge 18 are the first to open and that the bridge is in essence deactivated prior to the opening of the $F_1$, $F_2$, $R_1$, $R_2$ contact. Thus, in this system, only those contacts carrying signal currents rather than those carrying power currents must be opened under load.

The braking circuit in accordance with the present invention is found primarily in block 36 taking in conjunction with the two contacts $RS_1$ and $FS_1$ connected respectively across the FWD and REV contacts shown and described with respect to the reversing circuit 38. With reference still to FIG. 2, it is seen that the braking circuit 36 includes a switch 80 connected to one end of the armature 16. As illustrated by the dashed line 35, switch 80 is interconnected with the switch 34 which connects the battery 32 to the control potentiometer 30 such that upon the closing of the switch 80, switch 34 will be opened and, therefore, disconnect the battery from the potentiometer 30. The opening of switch 34 in effect places a zero signal as an input from the potentiometer to the thyristor phase control 28 representing, in the present embodiment, a call for zero motor speed. The free end of the switch 80 is connected to two resistors 82 and 84 which form the beginnings of two parallel paths. The other end of resistor 82 is connected to the cathode of a diode 85 which is connected between the emitter and base of a transistor 86. The collector of the transistor 86 forms an input to a FS relay coil 88 having in parallel therewith a free wheeling diode 90. The other end of the coil 88 is connected to the positive bus 42. The FS coil 88 has associated with it the $FS_1$ contact shown around the REV contact in the block 38. The free end of resistor 84 is connected to the anode of a diode 92 and to the emitter of a second transistor 94. The cathode of the diode 92 is connected to the emitter of transistor 86 and to the base of transistor 94. A suitable dropping resistor 96 connects the positive bus 42 to the collector of transistor 94 which is also connected via a resistor 98 to the base of a third transistor 100. The emitter of transistor 100 is connected to the positive bus 42 and its collector is connected to one end of an RS coil 102 the free end of which is connected to the negative bus 44 and which has a free-wheeling diode 104 connected in parallel therewith. Completing the circuit depiction of FIG. 2, a resistor 106 is provided between the free end of the armature 16 and the negative terminal of the battery 40.

The operation of the regenerative braking circuit in accordance with the present invention is as follows. The FWD and the REV switches are both interlocked with the braking switch 80 so that upon the closure of switch 80 the switches FWD and REV, if closed, will open. This mechanical interlocking has not been illustrated for sake of simplicity with the drawing. In the introductory summary, it was stated the regenerative braking circuit of the present invention serves, when activated, to immediately and automatically sense the direction of the rotation and to reverse the direction of power applied to the motor so that it will be brought to a rapid stop. It will be assumed, therefore, for purposes of illustration that the motor is running at some prescribed speed in the forward direction and that there is, therefore, a positive voltage at the upper terminal of the armature 16. With the closure of switch 80 the positive armature voltage will be applied through resistor 82 to the base of the transistor 86, rendering that transistor conductive such that a current path is established from the positive bus 42 through the FS relay 88 and transistor 86 to the negative bus 44 thus energizing the FS coil 88. With the closure of the switch 80, the FWD switch would have been opened and in the manner previously described the F and M coils 66 and 54 deenergized to remove the thyristor phase control 28 from the bridge 18. However, in the present instance, with the energization of the FS coil 88 the $FS_1$ contact in the block 38 will close to provide the same overall effect in the circuit as closing the REV switch. As such the R coil 46 will be energized and a short time thereafter the M coil 34 will be energized thus closing the contacts $M_1$–$M_4$ to reapply control to the bridge 18.

It will, however, be remembered that switch 34 was opened at the time of the closure of the braking switch 80 so that the control signal now being applied by the phase control 28 is that which will call for zero speed of the motor. As such the full wave rectification bridge will be applying power to the armature 16 through the $R_1$ and $R_2$ contacts in a direction in opposition to that in which the armature is rotating causing the motor to operate as a generator and supplying power back to the lines. It should be noted that if the motor is operating in one direction and the power being applied to the armature is in the other direction, that with a zero speed being specified by the control the total effect would most probably be for a "full on" condition of full wave rectification bridge. Normally, this might cause currents in excess of that which would be practical and to this end other circuitry for the control of current would be employed with the present invention to limit these currents. An example of one such safeguard may be found in U.S Pat. No. 3,812,409, "Current Limit Circuit For A DC Motor" by Edward H. Dinger, issued May 21, 1974 and assigned to the assignee of the present invention. This current limiting circuit does not, however, form a part of the present invention and has not been shown or described in detail in the present situation. When the motor has come to a complete hault, the positive voltage appearing at the top of the armature 16 will disappear such that the positive bias rendering the transistor 86 conductive is removed and the FS coil 88 will be deenergized in turn, opening contact $FS_1$ to deenergize the motor.

Conversely, assuming that the motor is running in the reverse direction and that power is being applied to the armature 16 by way of the $R_1$ and $R_2$ contacts and the brake switch is actuated, there will appear at the upper terminal of the armature 16 a negative voltage. This negative voltage will be applied by way of resistor 82 and diode 85 to the base of transistor 94 and will also be applied to the emitter of that same transistor by way of resistor 84. Resistors 82 and 84 are scaled such that the bias thus applied to the transistor 94 is such as to render it conductive and with the conduction of transistor 94 there is applied by way of resistors 96 and 98 a positive bias to transistor 100 rendering that transistor conductive. With the rendering of transistor 100 conductive there is established a current path from the positive bus 42 through that transistor and the RS coil 102 to the negative bus 44. The RS coil 102 is thus energized to close the $RS_1$ contact around the FWD switch. In a manner similar to that previously described the closing of the $RS_1$ contact effects the same type of operation as with closing the FWD contact such that the armature 16 is now connected to the full wave rectification bridge 18 through contacts $F_1$ and $F_2$ to thus apply power to the motor in a direction in opposition to its rotation.

Thus, it is seen that there has been shown and described a simple and efficient means for providing regenerative braking to a direct current motor such that the operation immediately effects a complete regenerative cycle in conjunction with a switching network and a full wave rectification bridge.

While there has been shown and described what is at present considered to be the preferred embodiment of the present invention, modifications thereto will immediately appear to those skilled in the art. For example, relays have been included to perform several of the various switching functions and it is readily obvious to those skilled in the art that appropriate solid state or other switching means could be substituted. It is also noted that while the means for sensing the direction of armature rotation has been that of sensing the armature voltage, other means such as a tachometer connected to the rotating apparatus could be utilized for this purpose. Further, although a shunt wound d.c. motor is illustrated, other types of motors such as a permanent magnet motors can employ the present invention with equal facility. It is not intended, therefore, that the present invention be limited to that shown and described but that the claims appended hereto be given the full interpretation and scope within the true meaning and spirit of the invention.

What is claimed is:

1. A control circuit for a direct current motor including an armature and operable from a source of alternating current power comprising:
   a. a full wave rectification bridge circuit for applying rectified power from said source to said motor, said bridge circuit including a controlled rectifier in each leg thereof;
   b. means for phase controlling the rectifiers of said bridge circuit to vary the effective power applied to said motor;
   c. reversing circuit means for selectively determining the direction of power application to said motor whereby the direction of armature rotation may be changed; and
   d. selectively operable braking circuit means for stoping the rotation of said armature including,
      i. direction sensing means for determining the direction of armature rotation, and
      ii. means responsive to said direction sensing means and associated with said reversing sensing means for controlling said bridge circuit to apply power to said motor in a direction opposite to that to drive the motor in the then existing direction of rotation.

2. The invention in accordance with claim 1 wherein the controlled rectifiers are thyristors.

3. The invention in accordance with claim 1 wherein the direct current motor is shunt wound.

4. The invention in accordance with claim 1 wherein the direct current motor is a permanent magnet motor.

5. The invention in accordance with claim 1 wherein the direction sensing means senses the polarity of the voltage across the armature.

6. The invention in accordance with claim 1 wherein said direction sensing means includes first and second semiconductor circuits responsive, respectively, to first and second polarities of voltage across said armature.

7. A control circuit for direct current motor, having an armature winding and a field winding, operable from a source of alternating current power comprising:
   a. rectifying means for supplying power from said source to said field winding;
   b. a full wave rectification bridge circuit for applying rectified power from said source to said armature winding, said bridge circuit including a controlled rectifier in each leg thereof;
   c. means for phase controlling the rectifiers of said bridge circuit to vary the effective power applied to said motor;
   d. reversing circuit means for selectively determining the relative direction of power applied to said armature and field windings whereby the direction of motor rotation may be changed; and
   e. selectively operable braking circuit means for stopping said motor including,
      i. direction sensing means for determining the direction of motor rotation, and
      ii. means responsive to said direction sensing means and associated with said reversing circuit means for controlling said bridge circuit to apply power to said armature winding in a direction opposite to that to drive the motor in the then existing direction of rotation.

8. The invention in accordance with claim 7 wherein the controlled rectifiers are thyristors.

9. The invention in accordance with claim 7 wherein the direct current motor is shunt wound.

10. The invention in accordance with claim 7 wherein said direction sensing means senses the polarity of the voltage across one of said windings.

11. The invention in accordance with claim 7 wherein said direction sensing means includes first and second semiconductor circuits responsive, respectively, to first and second polarities of voltage across one of said windings.

12. A control circuit for a direct current motor including an armature winding and operable from an alternating current power source comprising:
   a. a full wave rectification bridge circuit for applying rectified power from said source to said motor, said bridge circuit including a controlled rectifier in each leg thereof;
   b. means for phase controlling the rectifiers of said bridge circuit to vary the effective power applied to said motor;
   c. switching means for applying power from said bridge circuit to said armature winding selectively in first and second directions to effect, respectively, first and second directions of motor operation; and
   d. selectively operable regenerative braking means for stopping said motor, said braking means including,
      i. direction sensing means for sensing the direction of motor operation and for providing a signal indicative thereof, and
      ii. means associated with said switching means and responsive to said signal for effecting the application of power from said bridge circuit to said armature winding in a direction to oppose the then existing direction of operation.

13. The invention in accordance with claim 12 wherein the direction sensing means senses the polarity of the voltage across the armature winding.

14. The invention in accordance with claim 12 wherein the direction sensing means includes first and second transistor circuits responsive, respectively, to first and second polarities of voltage across said armature winding to provide said signal and wherein relays are included in the means associated with the switching means to effect the application of power to said armature winding.

* * * * *